United States Patent
Pugh, III

4,046,454
Sept. 6, 1977

[54] OPTICAL FIBER CONNECTOR

[75] Inventor: William Edward Pugh, III, Lilburn, Ga.

[73] Assignee: Bell Telephone Laboratories, Incorporated, Murray Hill, N.J.

[21] Appl. No.: 687,463

[22] Filed: May 18, 1976

[51] Int. Cl.² .............................................. G02B 5/16
[52] U.S. Cl. .................................. 350/96 C; 350/96 B
[58] Field of Search .................. 350/96 C, 96 B, 96 R; 339/48, 49 B, 258 R, 258 P

[56] References Cited

U.S. PATENT DOCUMENTS

| | | | |
|---|---|---|---|
| 3,798,099 | 3/1974 | Marcatili | 350/96 C |
| 3,864,018 | 2/1975 | Miller | 350/96 C |
| 3,871,935 | 3/1975 | Gloge et al. | 350/96 C |
| 3,885,859 | 5/1975 | Dalgleish et al. | 350/96 C |

*Primary Examiner*—John K. Corbin
*Assistant Examiner*—Stewart Levy
*Attorney, Agent, or Firm*—Charles E. Graves

[57] ABSTRACT

A thin chip having parallel, evenly spaced optical fiber-receiving grooves on at least one side forms the basic building block for a certain prior art multilayer optical fiber connector. The end arrays of fiber groups assembled within stacks of such chips are substantially identical in spacing, thus enabling a gang splice to be achieved with a simple abutment of the two end arrays. The present disclosure achieves vertical spacing between layers, as well as horizontal fiber spacing in a given layer, by including in the base of each chip a thin layer of compliant material to urge the fibers housed in the adjacent chip into their respective grooves. The compliance is sufficient to permit vertically adjacent chips to contact each other rather than to float atop fibers. The splice array additionally uses a key chip which rests upon a vertical reference surface with one end contacting a horizontal reference surface. These surfaces may form part of the permanent splice.

6 Claims, 5 Drawing Figures

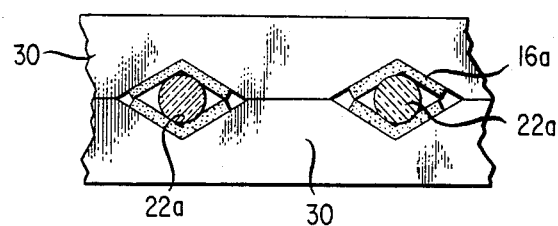
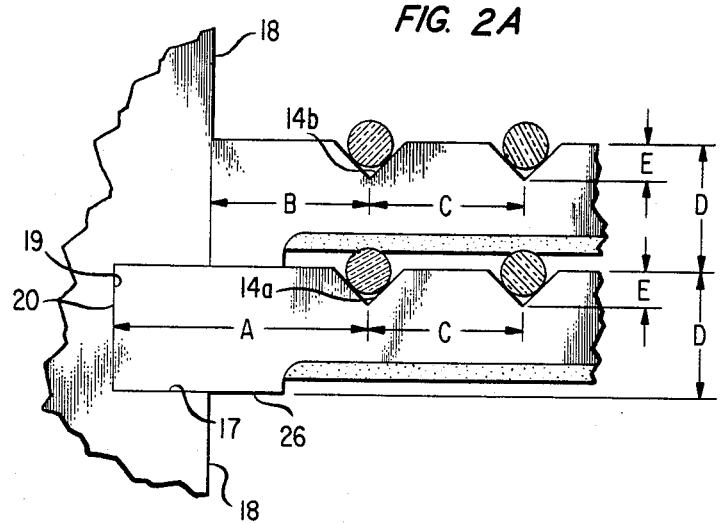
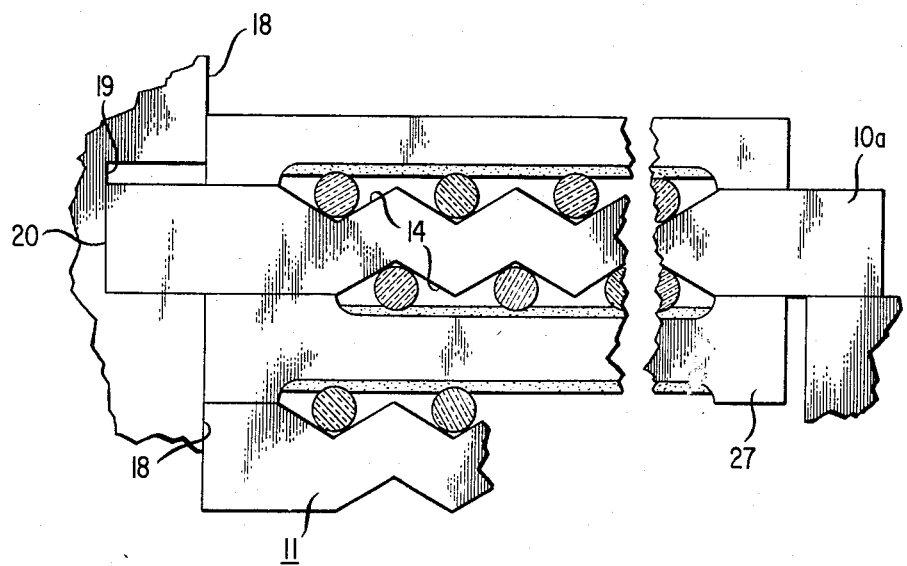

OPTICAL FIBER CONNECTOR

FIELD OF THE INVENTION

This invention relates to optical fiber splicing and, more particularly, to the splicing of several mating pairs of optical fibers in one operation.

BACKGROUND OF THE INVENTION

In the U.S. Pat. No. 3,864,018 of C. M. Miller, issued Feb. 4, 1975 and assigned to applicant's assignee, there is disclosed a technique for optically connecting the fibers of one group to mating fibers of a second group. The splicing hardware relies upon a thin chip with parallel evenly spaced grooves on both sides. A single fiber is received in each of the grooves. The fibers are each retained in the grooves by the base of a second chip, which rests atop the adjacent fibers. A stable array of optical fiber ends thus is produced which may be butted against a similarly assembled second end array to achieve a gang splice. This technique is disclosed in the cited Miller patent to which the reader is referred for further detail; and results in a splice with negligibly small fiber end separations and angular misalignments.

If the optical fibers being spliced should happen in a given case to vary significantly in outside diameter however, there arises the possibility of a transverse offset between the input and output fiber ends due to the fact that adjacent chips rest on the fibers. Significant transverse offset can result in excessive optical energy loss.

SUMMARY OF THE INVENTION

The array splice system of the present invention substantially avoids the transverse offset problem and minimizes the effect of cumulative tolerances within the parts forming the array layers. The optical fibers are contained in modular grooved chips which are located or keyed relative to each other through contact with horizontal and vertical reference surfaces.

In one embodiment, the fiber-receiving grooves are formed in the top of each chip and a layer of compliant material is included in its opposite side. Fibers in the grooves of one such chip are held in position by the compliant material of the adjacent chip which yields upon contacting the fibers. The compliance is sufficient to permit vertically adjacent chips to contact and rest upon each other instead of upon the contained fibers.

Advantageously, the splice array includes a key chip, which is similar in form to the modular chip but has extended ends. The key chip ends rest upon a vertical reference surface and one of the ends contacts a horizontal reference surface. These reference surfaces are advantageously provided by an assembly fixture.

Using the reference surfaces, the splice is built out from either side of the key chip. The number of parts between the vertical reference surface and the most distant fiber layer is thereby minimized, and so too is tolerance buildup. A cap chip without grooves may be used to enclose the splice. The components are then bonded together with an adhesive, and afterward the completed splice is normally removed from the fixture.

The invention and its further objects, features, and advantages will be more readily discerned from a reading of the description to follow of several illustrative embodiments.

BRIEF DESCRIPTION OF THE DRAWING

FIG. 2a is a diagram of the splice's end showing certan dimensions;

FIG. 3 is a schematic end view showing a further variation of the splice; and

FIG. 4 is a schematic end view of an additional inventive embodiment featuring different pad configurations.

DETAILED DESCRIPTION

Figure 1:
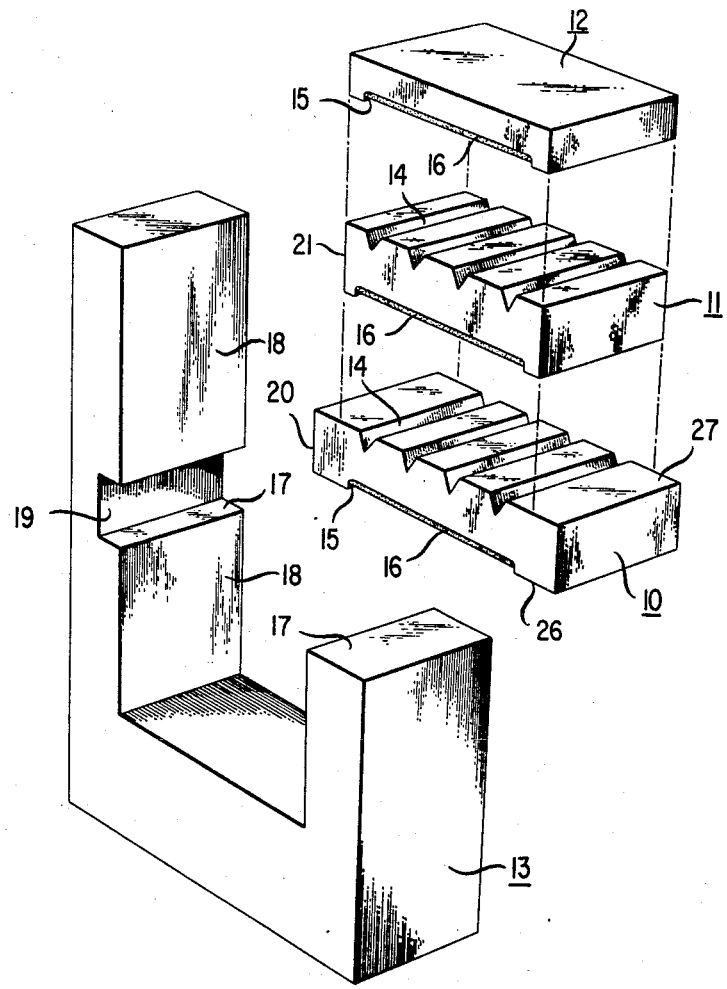
FIG. 1 is a schematic exploded side view showing one embodiment of the optical fiber splice.

FIG. 1 illustrates one form of key chip designated 10, to be assembled with a standard chip 11 and a cap 12 by use of assembly jig 13. The chips 10 and 11 each have a series of parallel, uniformly spaced grooves denoted 14. The grooves 14 advantageously are V-shaped, and each receives a single optical fiber. The underside of key chip 10, standard chip 11, and cap 12 each includes a cavity 15 containing a compliant layer 16.

Assembly fixture 13 includes a two-part vertical reference plane 17; a two-part horizontal plane 18; and between the two latter parts, a key chip horizontal reference plane 19 which is parallel to the reference plane 18 and perpendicular to the vertical reference plane 17.

Pursuant to one aspect of the invention, the successive uniformly spaced grooves 14 in the key chip 10 are horizontally referenced in location to surface or edge 20, by controlling the dimension denoted A in FIG. 2a between edge 20 and the center 14a of the first groove. Similarly, the uniformly spaced grooves 14 of standard chip 11 are referenced in a horizontal direction to far edge 21 by controlling the dimension denoted B between far edge 21 and the center 14b of the first groove of standard chip 11. The distance between any two adjacent groove centers on chip 11 and chip 10 is maintained at a fixed amount denoted C in FIG. 2a. Dimension A as defined above is greater than the dimension B by precisely the amount of the distance between the horizontal reference planes 18 and 19 of the fixture 13. Thus a key chip 10 resting with its vertical reference surface or edge 26 in contact with vertical reference surface 17 has its grooves 14 located fixedly in the vertical sense.

The thickness denoted D of the key chip is the distance between the planar surface 26 and planar top 27. This thickness advantageously is carried over to standard chips 11 as a fixed amount. Likewise, the groove depths denoted E on each groove of the chips 10 and 11 are a fixed amount.

Figure 2:
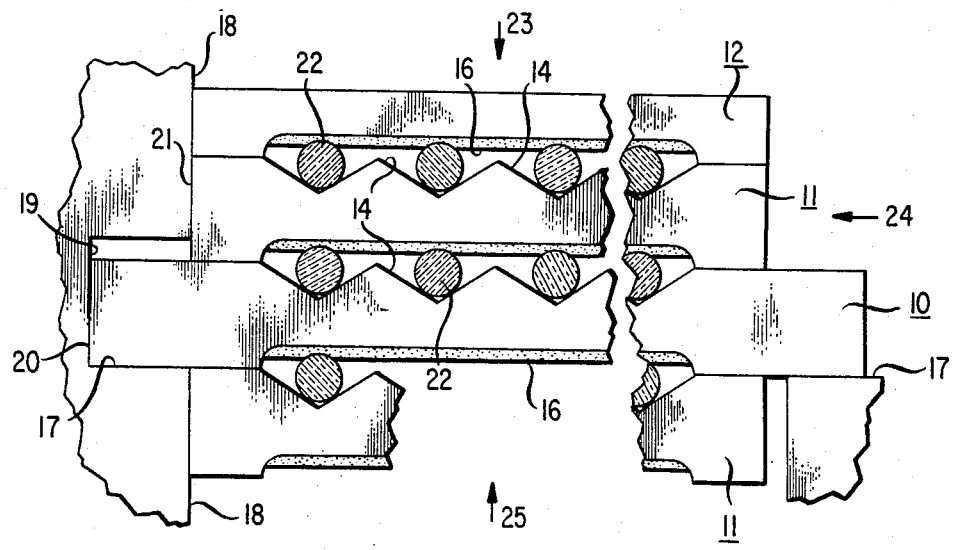
FIG. 2 is a schematic end view showing a second embodiment of the splice partially assembled.

An optical fiber splice is constructed by placing the bottom planar surface 26 of key chip 10 onto vertical reference plane 17 of the fixture 13, and bringing its horizontal reference edge 20 into contact with the reference plane 19 as shown in FIG. 2. Thereafter a number of optical fibers denoted 22 are placed in the grooves of key chip 10. A standard chip 11 is now placed atop key chip 10, its resilient pad 16 contacting the fibers 22 and urging each down into the apex of the respective V-grooves. The far edge 21 of chip 11 is placed in contact with the horizontal reference 18.

A second layer of optical fibers 22 are then emplaced in the grooves 14 of standard chip 11. Hereafter additional layers of optical fibers may be accommodated in similar fashion in one or more additional standard chips 11, by the stacking process just described in which each successive chip rests on the last installed chip and all are in contact with the reference plane 18. Advantageously, this side of the splice is completed by installation of a cap chip 12 which likewise is horizontally positioned against reference plane 18.

Since all compliant layers are in compression through contact with the optical fibers, it may be occasionally desirable to apply a downward vertical force denoted by arrow 23 to assure that the key chip 10, the one or more standard chips 11, and the cap chip 12, are in contact at their edges with no separation between the contacting surfaces. Similarly, it may be desirable to assure complete and continued contact of the reference edges 21, 20 with the horizontal reference planes 18 and 19 by the application of a force in the direction denoted by the arrow 24 in FIG. 2.

Pursuant to one aspect of the invention, additional optical fiber layers may be built out from the underside of key chip 10. Thus, in FIG. 2 one or more additional standard chips 11 are stacked from the underside of key chip 10 and kept in contact with each other and with horizontal reference plane 18 by application of force in the direction of arrows 24 and 25.

With the splice held in assembled position as described above, low viscosity cement is introduced into the interstices of the splice between the fibers 22, the resilient surfaces 16 and the V-groove surfaces 14, and allowed to set. Additionally or alternatively, a mechanical clamp such as, for example, a C clamp (not shown), may be placed around the stack assembly to exert continuing force in the direction of arrows 23, 25. Thereafter, in the manner described in the aforementioned Miller patent, the assembled end seen in FIG. 2, is ground optically flat. A first array of optical fiber ends thus is prepared for splicing.

A second array of optical fiber ends is prepared for splicing with the first array, in the manner described above. The two prepared halves of the fiber splice then are brought together on an alignment frame (not shown) which may be similar to jig 13, except that only reference surfaces 17 and 19 need be provided. The two key chips are introduced into opposite ends of the jig, and accurate axial alignment of the mating fibers of the first and second arrays are achieved by contacting the reference edges 20 to the horizontal reference plane 19 and flat base 26 with the vertical reference plane 17.

Suitable materials for the chips 10 and 11 and the end cap 12 include hard aluminum, stainless steel, fused quartz, crystalline silicon, or other temperature stable materials of relative rigidity. The materials advantageously have a coefficient of thermal expansion close to that of the fiber cladding. The compliant layer 16 advantageously is a soft metal such as soft aluminum, indium, or gold or other material including cellulose or suitable polymers. Compliant layer 16 has a sufficient thickness to assure the accommodation of all fiber diameters in the design range; and advantageously has a coefficient of thermal expansion near that of the glass fibers.

In a further embodiment pursuant to the invention, shown in FIG. 3, a key chip denoted 10a is produced with a row of spaced parallel V-shaped grooves on the upper surface and a row of spaced parallel V-shaped grooves on the lower surface as well. Layers of optical fibers may be built in the upward direction on key chip 10a, exactly in the manner described with respect to FIG. 2. The difference is that additional layers of optical fibers below key chip 10a require the use of an intermediate chip 27. This has the same dimensional control and reference surfaces as standard chip 11, but features two resilient layers 16. One or more standard chips 11 may be stacked upon the intermediate chip 27.

In a further variation of the invention shown in FIG. 4, the compliant fiber-gripping material is provided as a continuous or intermittent lining denoted 16a in each fiber groove. The modular chips in this variation, denoted 30, advantageously are formed with grooves on both surfaces. The compliant lining 16a contacts the fibers 22a on all sides. Differences in fiber diameter are accommodated by substantially equal yielding of each lining surface. The center axis of the fiber thus remains substantially coincident with the ideal central axis between matching V-grooves, regardless of minor variations of diameter. A further refinement in achieving abutting axial alignment of mating fiber ends is thus afforded.

It is to be understood that the embodiments described herein are merely illustrative of the principles of the invention. Various modifications may be made thereto by persons skilled in the art without departing from the spirit and scope of the invention.

What is claimed is:

1. Apparatus for assembling a first group of optical fibers into a fixed fiber end configuration preparatory for splicing to a second such group, comprising:

a key chip comprising:
 a horizontal and a vertical reference surface;
 a plurality of even-spaced, parallel fiber-receiving grooves on at least one side of said key chip, the first such groove being located a first fixed distance from the key chip horizontal reference surface and all such grooves being located a uniform distance from said key chip vertical reference surface;

a standard chip comprising:
 a horizontal and a vertical reference surface;
 a base including a recess;
 a plurality of evenly-spaced, parallel fiber-receiving grooves on at least one side, the first such groove being located a second fixed distance from the standard chip horizontal reference surface and all such grooves being located a uniform distance from the standard chip vertical reference surface;
 said second fixed distance being less than said first fixed distance; and compliant means comprising compliant fiber-contacting material recessed in said base of said standard chip.

2. The apparatus described in claim 1, further comprising one or more optical fibers disposed in the grooves of said key chip and held therein by the compliant means of said standard chip.

3. The apparatus of claim 1 wherein said key chip further comprises a recess in its base and compliant fiber-contacting material disposed in said recess.

4. The apparatus of claim 1 wherein said key chip further comprises a recess in its base and compliant fiber-contacting material disposed in said recess; said apparatus further comprising:

reference surface means for receiving said key and said standard chip comprising:
 a first reference plane consisting of two sections spaced apart by at least the width of said standard chip for locating the base of said key chip in a vertical sense; and a second reference plane perpendicular to said first reference plane at an exterior edge thereof for locating the key chip horizontal reference surface.

5. The apparatus of claim 4 further comprising:

a third reference plane perpendicular to said first reference plane at the adjacent interior edge thereof for locating the standard chip horizontal reference surface;

said second and third reference planes being spaced apart a distance equal to the difference between said second and said first fixed distances.

6. The apparatus of claim 4 further comprising optical fibers contained in at least one of the grooves of said key chip and said standard chip.

* * * * *